United States Patent
Andersen et al.

(10) Patent No.: US 8,438,967 B2
(45) Date of Patent: May 14, 2013

(54) PISTON PORTION FOR A PISTON ASSEMBLY AND A PISTON ASSEMBLY

(75) Inventors: Michael Andersen, Krefeld (DE); Martin Engels, Alpen (DE)

(73) Assignee: Norgren GmbH, Alpen (DE)

( * ) Notice: Subject to any disclaimer, the term of this patent is extended or adjusted under 35 U.S.C. 154(b) by 1143 days.

(21) Appl. No.: 12/374,327

(22) PCT Filed: Jul. 28, 2006

(86) PCT No.: PCT/EP2006/007512
§ 371 (c)(1),
(2), (4) Date: Jan. 19, 2009

(87) PCT Pub. No.: WO2008/011909
PCT Pub. Date: Jan. 31, 2008

(65) Prior Publication Data
US 2010/0000403 A1    Jan. 7, 2010

(51) Int. Cl.
*F16J 1/00*    (2006.01)
(52) U.S. Cl.
USPC ............................................................ 92/255
(58) Field of Classification Search .................... 92/175, 92/248, 255
See application file for complete search history.

(56) References Cited

U.S. PATENT DOCUMENTS

| 4,762,052 A * | 8/1988 | Stoll et al. .................. 92/250 |
| 4,998,461 A | 3/1991 | Ishiwata et al. |
| 5,813,313 A | 9/1998 | Stoll et al. |
| 6,397,987 B1 | 6/2002 | Pesch et al. |
| 6,629,587 B2 | 10/2003 | Gravier |

FOREIGN PATENT DOCUMENTS

| DE | 29607993 U1 | 8/1996 |
| DE | 202005010618 U1 | 9/2005 |
| EP | 0036538 A | 9/1981 |
| EP | 1568894 A2 | 8/2005 |
| FR | 2559227 A1 | 8/1985 |
| GB | 2153967 A | 8/1985 |
| WO | WO-2007/003311 A3 | 1/2007 |

* cited by examiner

*Primary Examiner* — Michael Leslie
(74) *Attorney, Agent, or Firm* — The Ollila Law Group LLC

(57) ABSTRACT

A piston portion (102) for a piston assembly (100) is provided according to an embodiment of the invention. The piston portion (102) includes a substantially cylindrical head portion (103) including a mating face (105). The piston portion (102) further includes a substantially annular insert chamber (126) formed in the mating face (105) and adapted for receiving a portion of a substantially annular insert (120).

25 Claims, 8 Drawing Sheets

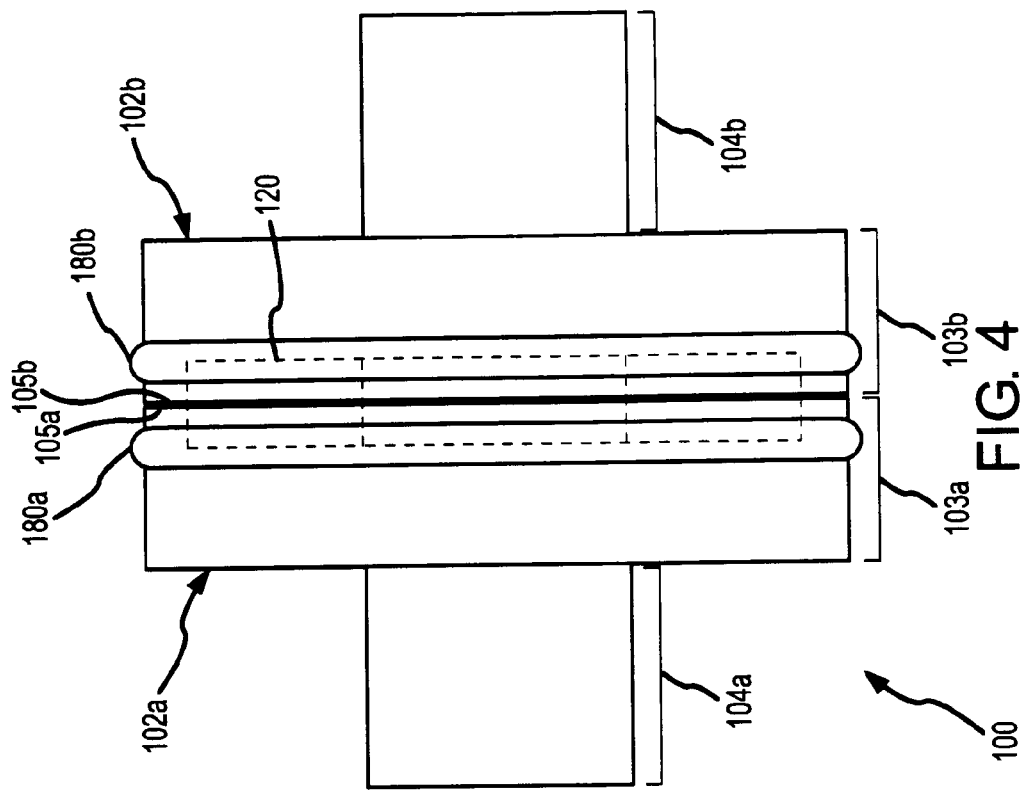
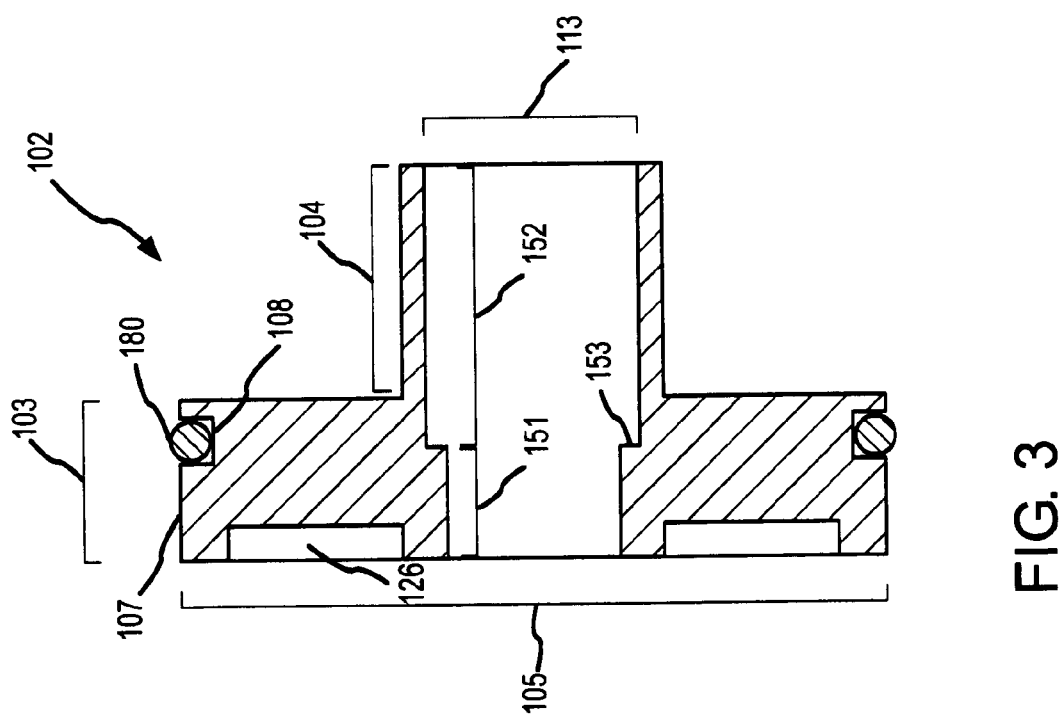

SECTION AA

SECTION BB

PISTON PORTION FOR A PISTON ASSEMBLY AND A PISTON ASSEMBLY

BACKGROUND OF THE INVENTION

1. Field of the Invention

The present invention relates to a piston, and more particularly, to a piston portion for a piston assembly and a piston assembly.

2. Statement of the Problem

In a piston assembly, a piston or plunger moves reciprocally in a piston chamber. A piston assembly can therefore be used to convert a fluid pressure into mechanical power or to convert mechanical power into a fluid pressure.

In pneumatic applications, it is often desirable to have a piston made of materials than are relatively light. For example, in pneumatic applications it is desirable to use a material that is lighter than metal. Metal components, such as a metal piston, have high moments of inertia and therefore take longer to accelerate and decelerate. Therefore, a piston component has in the prior art been formed of light, inexpensive materials such as plastic.

A drawback in the prior art is that plastic does not provide the rigidity and hardness of metal. A prior art plastic piston therefore can deform at high pneumatic pressures.

SUMMARY OF THE INVENTION

A piston portion for a piston assembly is provided according to an embodiment of the invention. The piston portion comprises a substantially cylindrical head portion including a mating face. The head portion further comprises a substantially annular insert chamber formed in the mating face and adapted for receiving a portion of a substantially annular stiffener insert.

A piston portion for a piston assembly is provided according to an embodiment of the invention. The piston portion comprises a substantially cylindrical head portion including a mating face. The head portion further comprises a substantially axial first bore extending at least partially through the head portion and a substantially axial second bore that connects to the first bore. The second bore is larger in diameter than the first bore and is separated from the first bore by a shoulder.

A piston assembly is provided according to an embodiment of the invention. The piston assembly comprises a first piston portion including a substantially cylindrical head portion and a mating face formed on the head portion, a second piston portion including a substantially cylindrical head portion and a mating face formed on the head portion, and a substantially annular insert positioned between the mating face of the first piston portion and the mating face of the second piston portion.

A piston assembly is provided according to an embodiment of the invention. The piston assembly comprises a first piston portion including a substantially cylindrical head portion and a mating face formed on the head portion, a second piston portion including a substantially cylindrical head portion and a mating face formed on the head portion, and a substantially annular insert positioned between the mating face of the first piston portion and the mating face of the second piston portion. The piston assembly further comprises a piston rod coupled to at least one of the first piston portion and the second piston portion, wherein a load experienced by the piston assembly is substantially transferred between the piston rod and the at least one of the first piston portion and the second piston portion.

ASPECTS OF THE INVENTION

In one embodiment of the piston portion, the piston portion further comprises a substantially axial first bore extending at least partially through the head portion and a substantially axial second bore extending at least partially through the head portion, with the second bore connecting to the first bore and with the second bore being larger in diameter than the first bore and separated from the first bore by a shoulder.

In another embodiment of the piston portion, the piston portion further comprises a substantially annular magnet chamber formed in the mating face.

In yet another embodiment of the piston portion, the piston portion further includes one or more interlock projections and one or more corresponding projection apertures formed on the mating face of the piston portion.

In yet another embodiment of the piston portion, the piston portion further comprises a substantially cylindrical sleeve portion joined to the head portion opposite the mating face.

In yet another embodiment of the piston portion, the piston portion further comprises a substantially cylindrical sleeve portion joined to the head portion opposite the mating face, a substantially axial first bore extending at least partially through the head portion, and a substantially axial second bore extending at least partially through the sleeve portion, with the second bore connecting to the first bore and with the second bore being larger in diameter than the first bore and separated from the first bore by a shoulder.

In yet another embodiment of the piston portion, the piston portion further comprises at least one circumferential seal groove formed in a circumferential piston surface of the head portion.

In yet another embodiment of the piston portion, the piston portion further comprises a substantially annular insert chamber formed in the mating face and adapted for receiving a portion of a substantially annular insert.

In one embodiment of the piston assembly, the second piston portion is identical to the first piston portion.

In another embodiment of the piston assembly, the piston assembly further comprises substantially annular insert chambers formed in the mating faces of the first piston portion and the second piston portion.

In yet another embodiment of the piston assembly, the first piston portion and the second piston portion are formed of a first material and the annular insert is formed of a second material.

In yet another embodiment of the piston assembly, the first piston portion and the second piston portion are formed of a first material and the annular insert is formed of a second material possessing a greater stiffness than the first material.

In yet another embodiment of the piston assembly, the piston assembly further comprises substantially annular magnet chambers formed in the mating faces of the first piston portion and the second piston portion and the piston assembly further comprises a substantially annular magnet positioned between the first piston portion and the second piston portion.

In yet another embodiment of the piston assembly, the piston assembly further includes one or more interlock projections and corresponding projection apertures formed on the mating face of the first piston portion and on the mating face of the second piston portion.

In yet another embodiment of the piston assembly, the first piston portion and the second piston portion further comprise a substantially cylindrical sleeve portion joined to the head portion opposite the mating face.

In yet another embodiment of the piston assembly, the first piston portion and the second piston portion further comprise a substantially axial first bore extending at least partially through the head portion and a substantially axial second bore connecting to the first bore, with the second bore being larger in diameter than the first bore and separated from the first bore by a shoulder.

In yet another embodiment of the piston assembly, the first piston portion and the second piston portion further comprise a substantially cylindrical sleeve portion joined to the head portion opposite the mating face, a substantially axial first bore extending at least partially through the head portion, and a substantially axial second bore extending at least partially through the sleeve portion, with the second bore connecting to the first bore and with the second bore being larger in diameter than the first bore and separated from the first bore by a shoulder.

In yet another embodiment of the piston assembly, the annular insert further comprises two outer annular components and a middle annular component sandwiched between the two outer annular components.

In yet another embodiment of the piston assembly, the annular insert further comprises two outer annular components formed of a first material and a middle annular component sandwiched between the two outer annular components and formed of a second material.

In yet another embodiment of the piston assembly, the annular stiffener insert further comprises two outer annular components, a middle annular component sandwiched between the two outer annular components, and a circumferential magnet groove formed in an outer circumferential surface of the middle annular component.

In yet another embodiment of the piston assembly, the piston assembly further comprises a piston rod coupled to at least one piston portion, wherein a load experienced by the piston assembly is substantially transferred between the piston rod and the at least one piston portion.

DESCRIPTION OF THE DRAWINGS

The same reference number represents the same element on all drawings. It should be understood that the drawings are not necessarily to scale.

FIG. 3 is a cross-sectional view of a piston portion according to an embodiment of the invention.

FIG. 4 shows the piston assembly formed of two piston portions 102 of FIG. 3.

DETAILED DESCRIPTION OF THE INVENTION

FIGS. 1-10 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
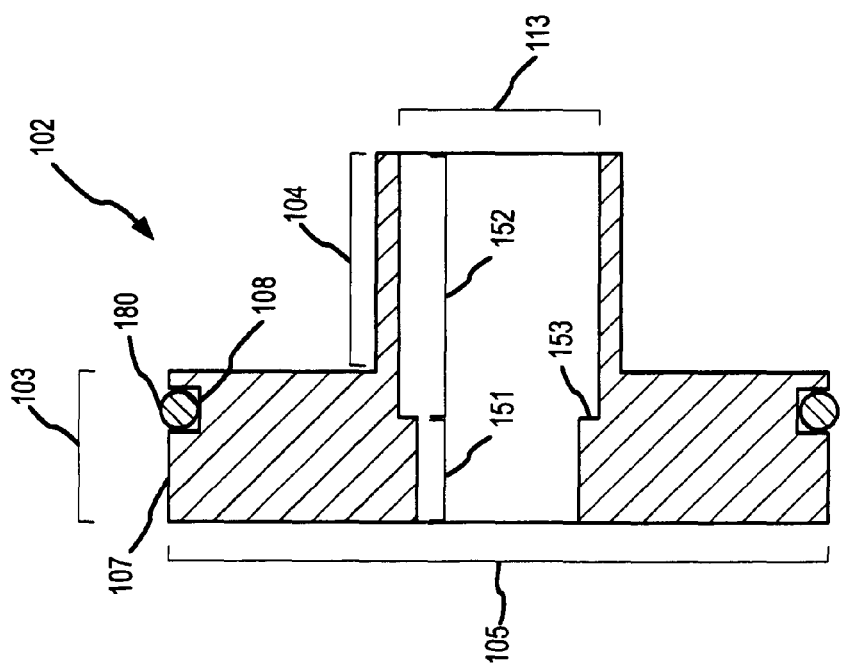
FIG. 1 is a cross-sectional view of a piston portion according to an embodiment of the invention.

FIG. 1 is a cross-sectional view of a piston portion 102 according to an embodiment of the invention. Components in common with other figures share reference numbers. The piston portion 102 comprises a head portion 103 and a sleeve portion 104. The head portion 103 and the sleeve portion 104 are substantially cylindrical in shape. The head portion 103 moves reciprocally in a piston chamber (not shown). Two such piston portions 102 can be assembled to form a piston assembly 100 (see FIGS. 2, 4, 7-8, and 10).

The head portion 103 includes a circumferential piston surface 107 and at least one circumferential seal groove 108 formed in the circumferential piston surface 107. The circumferential seal groove 108 receives a seal 180 (see FIG. 2). The seal 180 can comprise any suitable sealing device. The seal 180 slidably seals the head portion 103 to the piston chamber.

The head portion 103 further includes a mating face 105. The sleeve portion 104 is joined to the head portion 103 opposite the mating face 105. The mating face 105 is brought adjacent to or into contact with a mating face of a second piston portion 102 in order to form the piston assembly 100.

Figure 7:
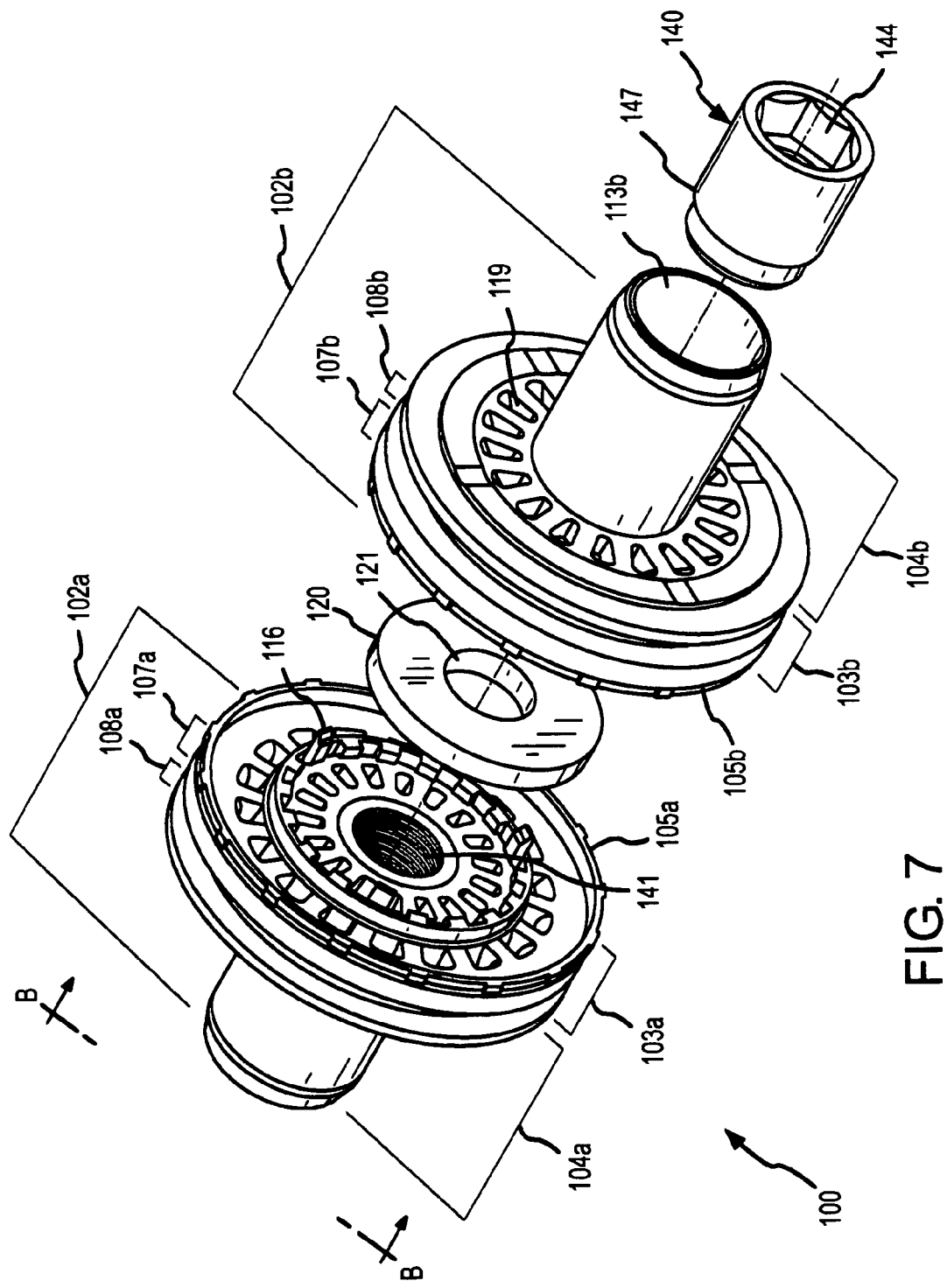
FIG. 7 shows a piston assembly according to an embodiment of the invention.
Figure 8:
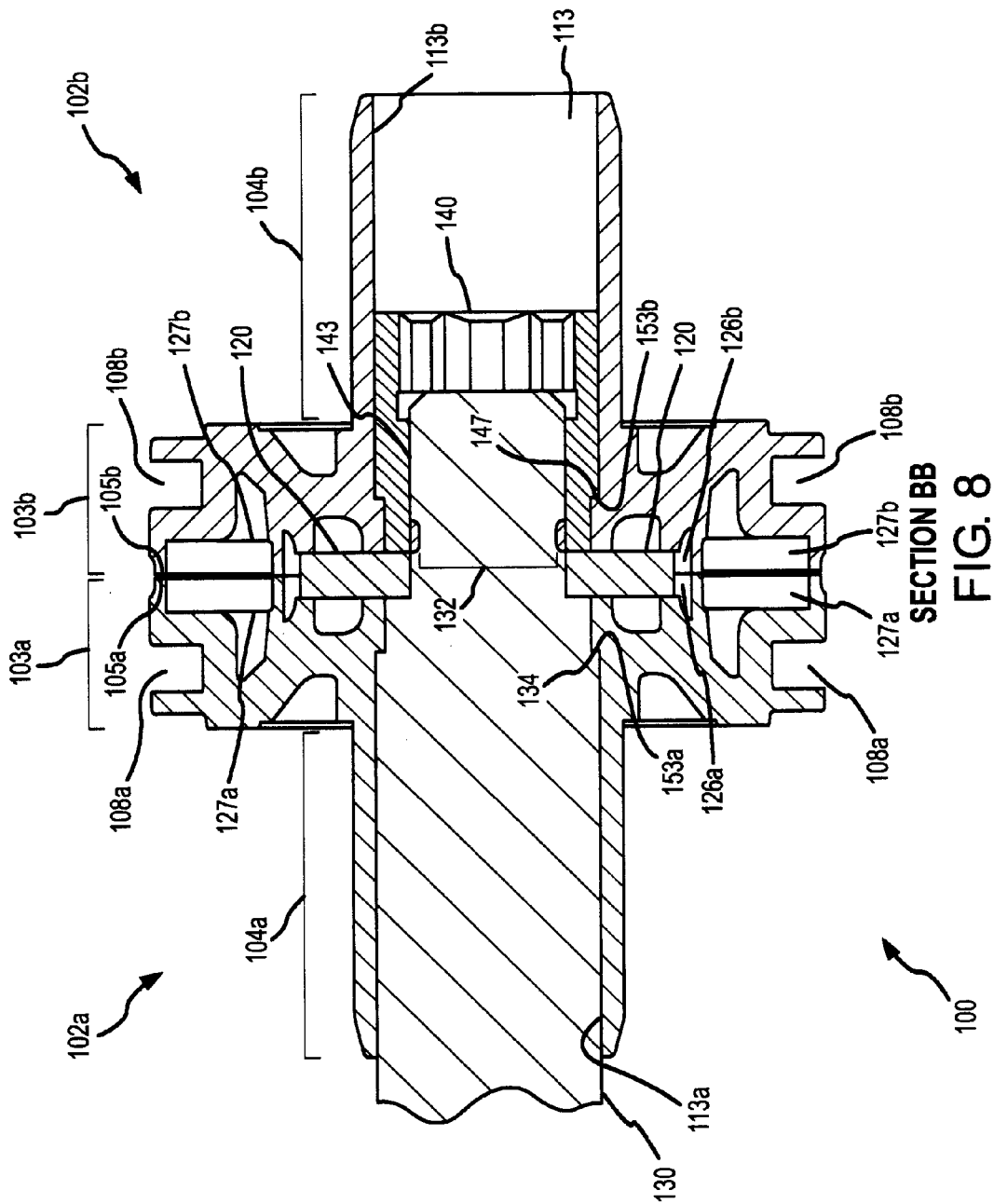
FIG. 8 comprises a cross-sectional view AA of the piston assembly comprising two assembled, clamped-together piston portions according to an embodiment of the invention.

The sleeve portion 104 can help retain the piston portion 102 on a piston rod 130 or female fastener 140 (see FIGS. 7-8). In addition, the sleeve portion 104 can provide longitudinal stability to the piston assembly 100. Moreover, the sleeve portion 104 can provide a cushioning function.

The piston portion 102 includes a substantially axial bore 113 that extends through the piston portion 102. The bore 113 comprises two bore portions. A first bore portion 151 extends at least partially through the head portion 103. A second bore portion 152 extends at least partially through the sleeve portion 103. The second bore portion 152 is connected to the first bore portion 151. The second bore portion 152 is larger in diameter than the first bore portion 151 and is separated from the first bore portion 151 by a shoulder 153. The shoulder 153 can be located in the head portion 103 or can be located in the sleeve portion 104. The size and location of the shoulder 153 can be varied according to a desired clamping force and/or according to the dimensions of fastener components.

Figure 2:
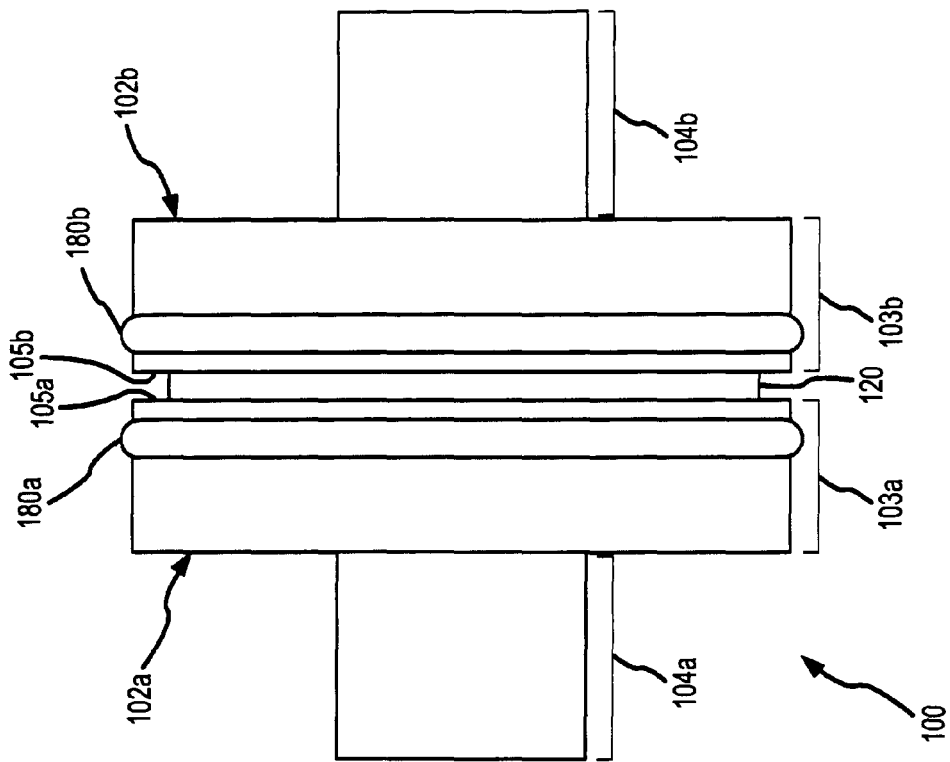
FIG. 2 shows a piston assembly formed of two piston portions of FIG. 1 according to an embodiment of the invention.

FIG. 2 shows a piston assembly 100 formed of two piston portions 102 of FIG. 1 according to an embodiment of the invention. The piston assembly 100 therefore comprises a first piston portion 102a and a second piston portion 102b. In one embodiment, the two piston portions 102a and 102b are identical. The two piston portions 102a and 102b are therefore economical to produce. As a result, the piston assembly 100 is economical and straightforward to manufacture.

A substantially annular insert 120 is clamped between the first piston portion 102a and the second piston portion 102b. A load experienced by the piston assembly 100 is substantially transferred between the piston rod 130 and the at least one piston portion 102 (depending on the direction of the load force). The load can also be transferred to a fastener(s) used to clamp the first piston portion 102a and the second piston portion 102b to the piston rod 130. The annular insert 120 includes a substantially axial aperture 121 (see FIG. 7). In one embodiment, the two piston portions 102a and 102b are formed of a first material and the annular insert 120 is formed of a second material. The annular insert 120 provides increased stiffness to the piston assembly 100. Where the piston portions 102a and 102b are formed of a material having a low or moderate stiffness, the annular insert 120 can greatly increase the overall stiffness of the piston assembly 100 while not greatly increasing the overall mass and inertia of the piston assembly 100.

In one embodiment, the piston portions 102a and 102b are formed of a lightweight material, such as plastic. Plastic is inexpensive, is easy to form or fabricate, is substantially rigid and hard, and provides a relatively low mass. The low mass advantageously lowers an inertial characteristic of the piston, which is beneficial in pneumatic piston applications. However, it should be understood that other materials can be used for the piston portions 102a and 102b.

In one embodiment, the annular insert 120 is formed of a second material possessing a greater stiffness than the first material. For example, the annular insert 120 can be formed of metal. However, it should be understood that the annular insert 120 can be formed of any suitable material that possesses a satisfactory stiffness.

FIG. 3 is a cross-sectional view of a piston portion 102 according to an embodiment of the invention. In this embodiment, a substantially annular insert chamber 126 is formed in the mating face 105. The annular insert chamber 126 comprises a substantially annular depression formed in the mating face 105. Two such depressions form the complete annular insert chamber 126. The complete annular insert chamber 126 receives at least a portion of the annular insert 120.

FIG. 4 shows the piston assembly 100 formed of two piston portions 102 of FIG. 3. The annular insert 120 is received in the annular stiffness insert chambers 126 formed in the mating faces 105 of the piston portions 102, as previously discussed. In one embodiment, the two piston portions 102a and 102b are formed of a first material and the annular insert 120 is formed of a second material. In the embodiment shown, the annular insert 120 is completely contained in the annular insert chambers 126 of the first piston portion 102a and the second piston portion 102b. Alternatively, the annular insert chambers 126 can be formed to receive only a portion of the annular insert 120, and a gap may exist between the first mating face 105a and the second mating face 105b.

Figure 5:
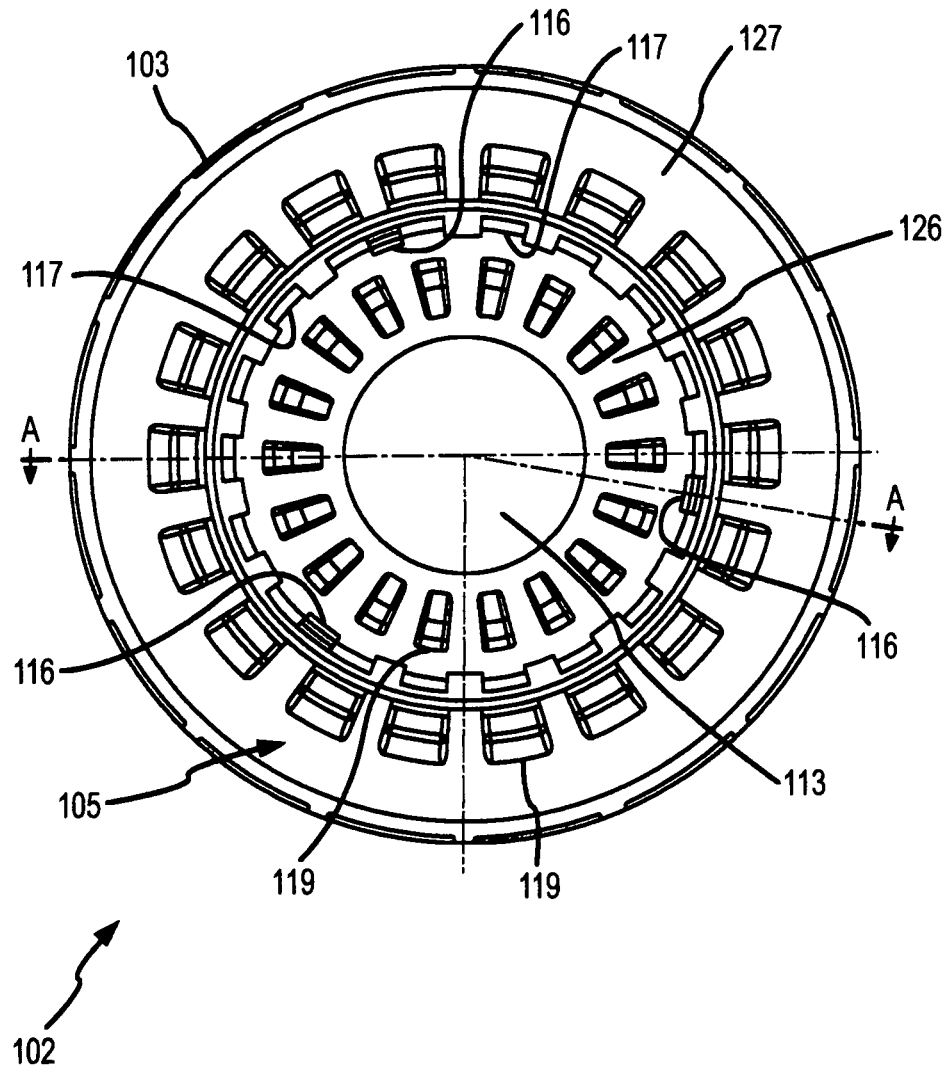
FIG. 5 is an end view of a piston portion according to an embodiment of the invention.

FIG. 5 is an end view of a piston portion 102 according to an embodiment of the invention. The mating face 105 in this embodiment includes the substantially annular stiffness insert chamber 126 and a substantially annular magnet chamber 127. The annular stiffness insert chamber 126 and the annular magnet chamber 127 are shown and discussed in detail in FIG. 6 and the accompanying text below.

The mating face 105 in this embodiment includes one or more interlock projections 116 and one or more corresponding projection apertures 117. When the mating surfaces 105 of two piston portions 102 are brought into contact, the one or more interlock projections 116 fit into available projection apertures 117. An interlock projection 116 fits into a corresponding cavity in an opposite piston portion 102 and prevents rotation of the piston portions 102 with respect to each other. In addition, an interlock projection can provide an axial fixation when engaged with a corresponding cavity.

In the embodiment shown, the piston portion 102 includes three interlock projections 116. In the embodiment shown, the piston portion 102 includes more projection apertures 117 than interlock projections 116. It should be understood that the number of interlock projections 116 and projection apertures 117 can be varied as needed.

An interlock projection 116 can comprise a tab, tongue, rib, etc. Alternatively, the interlock projection 116 can comprise a projection including a fastener, such as any manner of barb, hook, spring, etc., that engages a corresponding aperture in the opposing piston portion 102.

The piston portion 102 further includes a plurality of blind depressions 119. The depressions 119 can be formed in the piston portion 102 in order to decrease the mass. The depressions 119 do not pass through the head portion 103.

Figure 6:
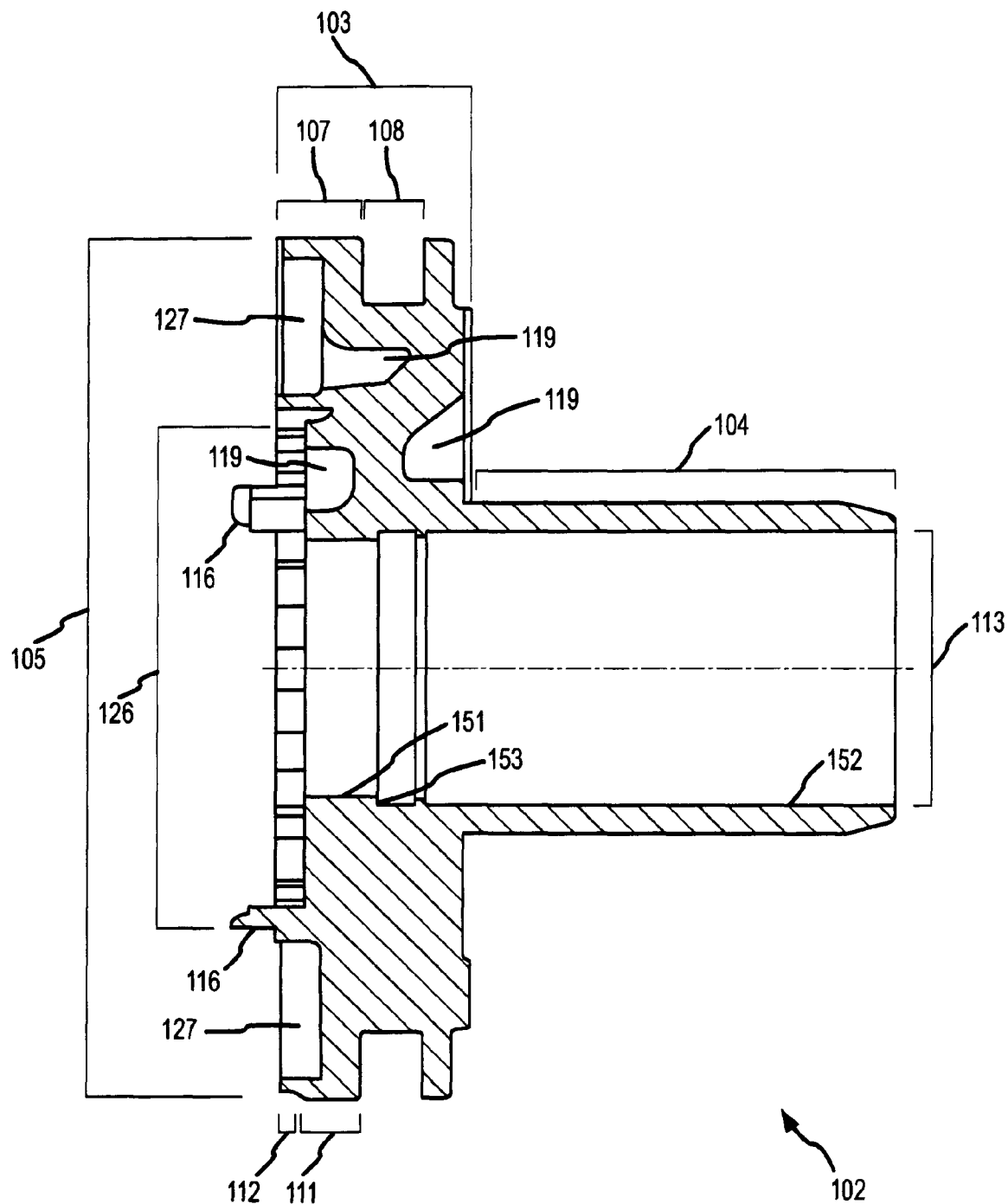
FIG. 6 is a cross-sectional view AA of the piston portion of FIG. 5 according to an embodiment of the invention.

FIG. 6 is a cross-sectional view AA of the piston portion 102 of FIG. 5 according to an embodiment of the invention. The circumferential piston surface 107 in this embodiment additionally includes a wear region 111 and a lubricant pocket 112.

The cross-sectional view shows the mating face 105. The mating face 105 includes the annular insert chamber 126, the annular magnet chamber 127, and the one or more interlock projections 116.

The annular magnet chamber 127 comprises a substantially annular depression formed in the mating face 105. Two such depressions in the piston portions 102a and 102b form the complete annular magnet chamber 127. The annular magnet chamber 127 receives a portion of an annular magnet 190 (see FIG. 10).

FIG. 7 shows a piston assembly 100 according to an embodiment of the invention. The piston assembly 100 comprises two piston portions 102a and 102b. The two piston portions 102a and 102b are assembled at the mating faces 105 to form the piston assembly 100.

The piston assembly 100 includes the substantially annular insert 120. The annular insert 120 includes a substantially axial aperture 121. In one embodiment, the two piston portions 102a and 102b are formed of a first material and the annular insert 120 is formed of a second material. The annular insert 120 is positioned between the piston portions 102 during assembly. In one embodiment, the annular insert 120 is clamped between the piston portions 102. In one embodiment, the annular insert 120 is clamped between the piston portions 102. The annular insert 120 therefore increases a stiffness of the piston assembly 100.

In the embodiment shown, the piston assembly 100 can include two female fasteners 140 and 141. A threaded piston rod 130 (see FIG. 8) engages both of the female fasteners 140 and 141 and substantially clamps the female fasteners 140 and 141 to the annular insert 120.

FIG. 8 comprises a cross-sectional view AA of the piston assembly 100 comprising two assembled, clamped-together piston portions 102a and 102b according to an embodiment of the invention. In the figure, the two piston portions 102a and 102b are clamped together at their mating faces 105 to form the piston assembly 100. In addition, the piston assembly 100 further includes a piston rod 130. The piston rod 130 is coupled to at least one piston portion 102. A load experienced by the piston assembly 100 is substantially transferred between the piston rod 130 and the at least one piston portion 102. The load can also be transferred to a fastener(s) used to clamp the piston portions 102a and 102b to the piston rod 130, as previously discussed.

In one embodiment, the piston assembly 100 further includes the female fastener 140. The piston rod 130 includes a threaded end 132 and a piston rod shoulder 134. The female fastener 140 includes a threaded (female) aperture 143 and a tool receptacle 144 (see FIG. 7). The female fastener 140 also includes a female fastener shoulder 147 that contacts and is stopped by the shoulder 153b of the bore 113b. Consequently, when the female fastener 140 is threadingly attached to the piston rod 130, the piston rod 130 and the female fastener 140 clamp together the two piston portions 102.

During assembly, the piston rod 130 is inserted into the bore 113a of the piston portion 102a and the threaded piston rod 130 and the threaded female fastener 140 are mated. The piston rod shoulder 134 contacts the shoulder 153a of the bore 113a and the female fastener shoulder 147 contacts the shoulder 153b of the bore 113b. In addition, the piston rod 130 and the female fastener 140 contact and compress the annular insert 120 as they are tightened. Therefore, as the piston rod 130 and the female fastener 140 are tightened, they exert a compression force on the annular insert 120. At about the end of the tightening, the piston rod 130 and the female fastener 140 in some embodiments will exert some compression force on the two piston portions 102. However, depending on the tolerances of the shoulders 153a and 153b and on the tolerance of the annular insert 120, the compression force on the two piston portions 102 may be minimal. Alternatively, in other embodiments the piston rod 130 and the female fastener 140 do not clamp together the two piston portions 102a and 102b. As a result, a load on a particular piston portion will be transferred substantially to the annular insert 120 and consequently will not be transferred to the other piston portion 102.

Figure 9:
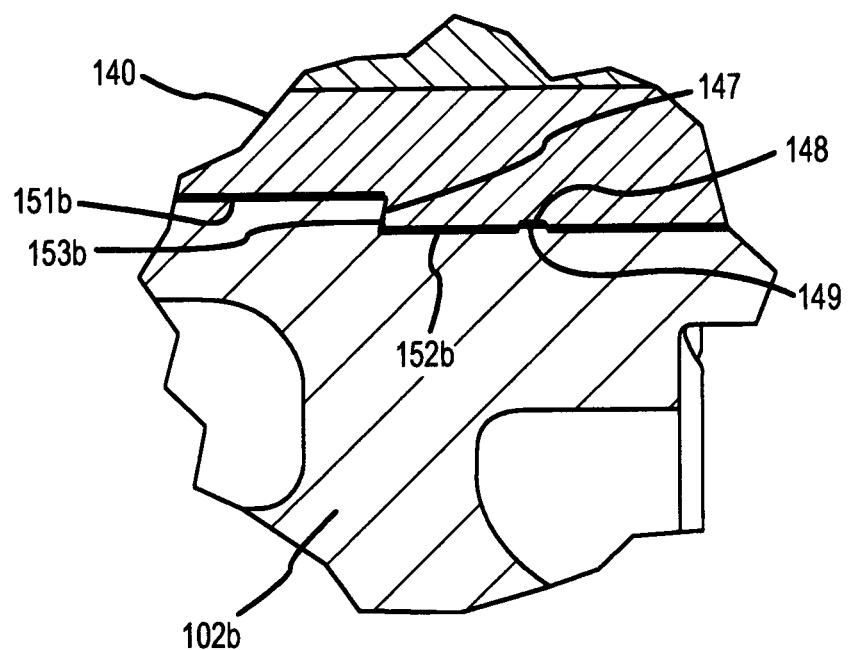
FIG. 9 is a detail enlargement of the piston assembly showing the shoulder of the piston portion contacting the female fastener shoulder.

FIG. 9 is a detail enlargement of the piston assembly 100 showing the shoulder 153b of the piston portion 102b contacting the female fastener shoulder 147. The shoulder 153b can comprise the shoulder of either piston portion 102 of FIG. 8, as the piston portions 102a and 102b can be identical. In addition, the female fastener 140 can include a groove 148 and a seal 149 that resides in the groove 148. The seal 149 seals the female fastener 140 to the second bore portion 152b. Alternatively, the groove 148 and the seal 149 can be a part of the piston 102. Moreover, the groove 148 can also be formed as a step. In another alternative, it should be understood that instead of the female fastener 140, the upper device in the figure could comprise a male fastener (such as a portion of the piston rod 130).

In one embodiment, the shoulder 153b comprises a substantially vertical surface. Alternatively, the shoulder 153b can include a slope, wherein the shoulder 153b comprises a deformable, circular ridge or projection in the bore 113. As a result, the ridge-shaped or projecting shoulder 153b can be somewhat deformed during clamping of the piston portions 102a and 102b. The deforming can minimize or eliminate compression of the mating faces 105a and 105b against each other, in order to avoid deforming the piston portions 102a and 102b

Figure 10:
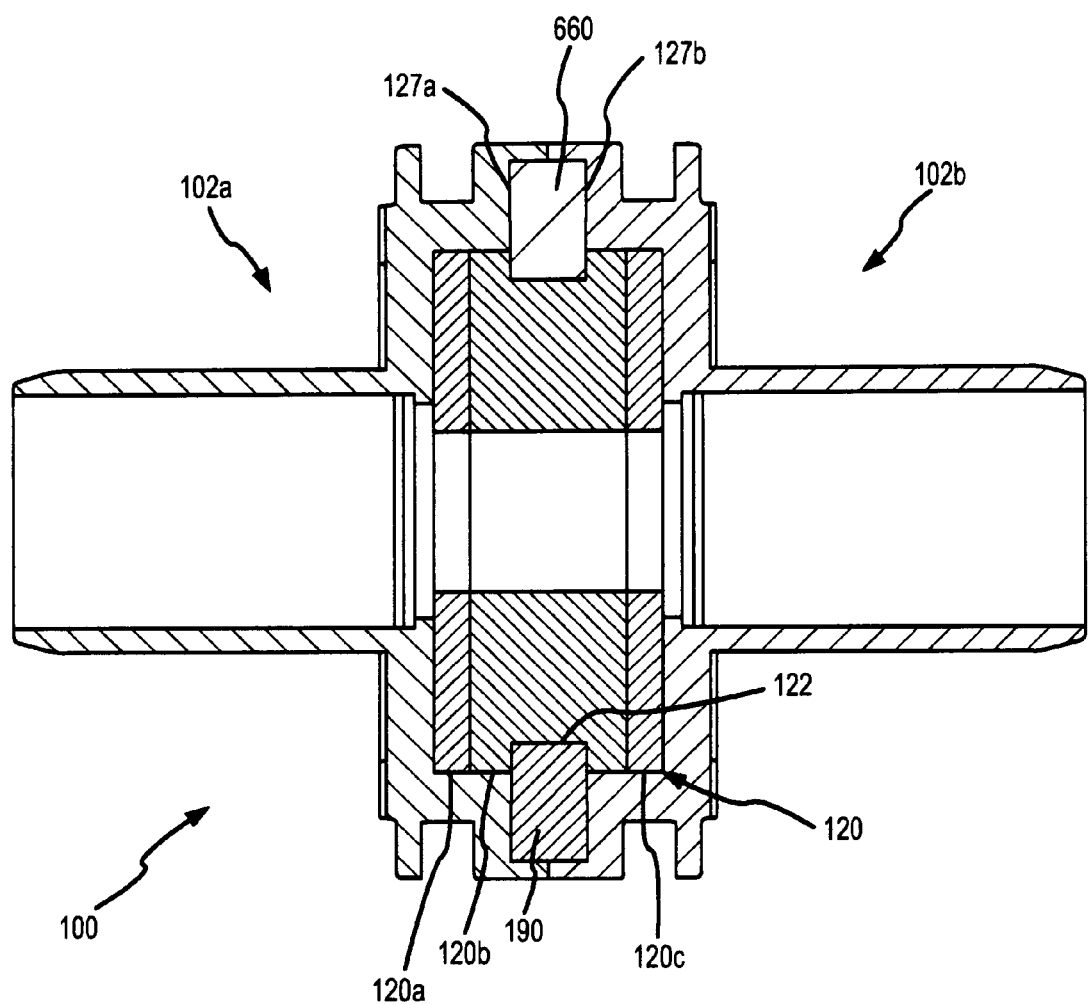
FIG. 10 shows the piston assembly according to an embodiment of the invention.

FIG. 10 shows the piston assembly 100 according to an embodiment of the invention. The annular insert 120 can comprise two or more annular components. In the embodiment shown, the annular insert 120 comprises three annular components 120a, 120b, and 120c. In some embodiments, the outer annular components 120a and 120c are formed of a first material and the middle annular component 120b is formed of a second material. In some embodiments, the outer annular components 120a and 120c can comprise metal or a material of a stiffness greater than the material forming the piston portions 102a and 102b. In addition, the middle annular component 120b can comprise a material that is less stiff than the outer annular components 120a and 120c. For example, in one embodiment the middle annular component 120b can comprise plastic.

The annular components in one embodiment can be unaffixed pieces. Alternatively, in another embodiment the annular components can be affixed to each other. For example, the annular components can be bonded together or otherwise affixed.

The annular insert 120 can further include a circumferential magnet groove 122. The circumferential magnet groove 122 is formed in an outer circumferential surface of the annular insert 120. The circumferential magnet groove 122 can be as wide as or narrower than the middle annular component 120b. The circumferential magnet groove 122 can receive a portion of a magnet 190. The magnet 190 can comprise a portion of a sensor assembly, for example, such as a Hall Effect sensor.

The piston assembly according to the invention can be employed according to any of the embodiments in order to provide several advantages, if desired. The invention provides a lightweight piston assembly. The invention provides a piston assembly formed of two identical piston portions. The invention provides a piston assembly that is economical to produce. The invention provides a piston assembly that is easy to assemble.

What is claimed is:

1. A piston assembly (100), comprising:
   a first piston portion (102a) including a substantially cylindrical head portion (103a), a mating face (105a) formed on the head portion (103a), and a substantially annular stiffness insert chamber (126a) formed in the mating face (105a) and adapted for receiving a portion of a substantially annular stiffness insert (120);
   a second piston portion (102b) including a substantially cylindrical head portion (103b), a mating face (105b) formed on the head portion (103b), and a substantially annular stiffness insert chamber (126b) formed in the mating face (105b) and adapted for receiving a portion of the substantially annular stiffness insert (120); and
   the substantially annular stiffness insert (120) clamped between the mating face (105a) of the first piston portion (102a) and the mating face (105b) of the second piston portion (102b).

2. The piston assembly (100) of claim 1, with the second piston portion (102b) being identical to the first piston portion (102a).

3. The piston assembly (100) of claim 1, with the first piston portion (102a) and the second piston portion (102b) being formed of a first material and with the annular stiffness insert (120) being formed of a second material.

4. The piston assembly (100) of claim 1, with the first piston portion (102a) and the second piston portion (102b) being formed of a first material and with the annular stiffness insert (120) being formed of a second material possessing a greater stiffness than the first material.

5. The piston assembly (100) of claim 1, further comprising substantially annular magnet chambers (127a, 127b) formed in the mating faces (105a, 105b) of the first piston portion (102a) and the second piston portion (102b) and with the piston assembly (100) further comprising a substantially annular magnet (190) positioned between the first piston portion (102a) and the second piston portion (102b).

6. The piston assembly (100) of claim 1, further including one or more interlock projections (116) and corresponding projection apertures (117) formed on the mating face (105a) of the first piston portion (102a) and on the mating face (105b) of the second piston portion (102b).

7. The piston assembly (100) of claim 1, with the first piston portion (102a) and the second piston portion (102b) further comprising a substantially cylindrical sleeve portion (104) joined to the head portion (103) opposite the mating face (105).

8. The piston assembly (100) of claim 1, with the first piston portion (102a) and the second piston portion (102b) further comprising:
a substantially axial first bore (151a, 151b) extending at least partially through the head portion (103a, 103b); and
a substantially axial second bore (152a, 152b) connecting to the first bore (151a, 151b), with the second bore (152a, 152b) being larger in diameter than the first bore (151a, 151b) and separated from the first bore (151a, 151b) by a shoulder (153a, 153b).

9. The piston assembly (100) of claim 1, with the first piston portion (102a) and the second piston portion (102b) further comprising:
a substantially cylindrical sleeve portion (104a, 104b) joined to the head portion (103a, 103b) opposite the mating face (105a, 105b);
a substantially axial first bore (151a, 151b) extending at least partially through the head portion (103a, 103b); and
a substantially axial second bore (152a, 152b) extending at least partially through the sleeve portion (104a, 104b), with the second bore (152a, 152b) connecting to the first bore (151a, 151b) and with the second bore (152a, 152b) being larger in diameter than the first bore (151a, 151b) and separated from the first bore (151a, 151b) by a shoulder (153a, 153b).

10. The piston assembly (100) of claim 1, with the annular stiffness insert (120) further comprising:
two outer annular assembly components (120a, 120c); and
a middle annular stiffness component (120b) sandwiched between the two outer annular stiffness components (120a, 120c).

11. The piston assembly (100) of claim 1, with the annular stiffness insert (120) further comprising:
two outer annular stiffness components (120a, 120c) formed of a fiat material; and
a middle annular stiffness component (120b) sandwiched between the two outer annular stiffness components (120a, 120c) and formed of a second material.

12. The piston assembly (100) of claim 1, with the annular stiffness insert (120) further comprising:
two outer annular-stiffness components (120a, 120c);
a middle annular stiffness component (120b) sandwiched between the two outer annular stiffness components (120a, 120c); and
a circumferential magnet groove (122) formed in an outer circumferential surface of the middle annular component (120b).

13. The piston assembly (100) of claim 1, further comprising a piston rod (130) coupled to at least one piston portion (102), wherein a load experienced by the piston assembly (100) is substantially transferred between the piston rod (130) and the at least one piston portion (102).

14. A piston assembly (100), comprising:
a first piston portion (102a) including a substantially cylindrical head portion (103a), a mating face (105a) formed on the head portion (103a), and a substantially annular stiffness insert chamber (126a) formed in the mating face (105a) and adapted for receiving a portion of a substantially annular stiffness insert (120);
a second piston portion (102b) including a substantially cylindrical head portion (103h), a mating face (105b) formed on the head portion (103b), and a substantially annular stiffness insert chamber (126b) formed in the mating face (105b) and adapted for receiving a portion of the substantially annular stiffness insert (120);
the substantially annular stiffness insert (120) clamped between the mating face (105a) of the first piston portion (102a) and the mating face (105b) of the second piston portion (102b); and
a piston rod (130) coupled to at least one of the first piston portion (102a) and the second piston portion (102b), wherein a load experienced by the piston assembly (100) is substantially transferred between the piston rod (130) and the at least one of the first piston portion (102a) and the second piston portion (102b).

15. The piston assembly (100) of claim 14, with the second piston portion (102b) being identical to the first piston portion (102a).

16. The piston assembly (100) of claim 14, with the first piston portion (102a) and the second piston portion (102b) being formed of a first material and with the annular stiffness insert (120) being formed of a second material.

17. The piston assembly (100) of claim 14, with the first piston portion (102a) and the second piston portion (102b) being formed of a first material and with the annular stiffness insert (120) being formed of a second material possessing a greater stiffness than the first material.

18. The piston assembly (100) of claim 14, further comprising substantially annular magnet chambers (127a, 127b) formed in the mating faces (105a, 105b) of the first piston portion (102a) and the second piston portion (102b) and with the piston assembly (100) further comprising a substantially annular magnet (190) positioned between the first piston portion (102a) and the second piston portion (102b).

19. The piston assembly (100) of claim 14, further including one or more interlock projections (116) and corresponding projection apertures (117) formed on the mating face (105a) of the first piston portion (102a) and on the mating face (105b) of the second piston portion (102b).

20. The piston assembly (100) of claim 14, with the first piston portion (102a) and the second piston portion (102b) further comprising a substantially cylindrical sleeve portion (104a, 104b) joined to the head portion (103a, 103b) opposite the mating face (105a, 105b).

21. The piston assembly (100) of claim 14, with the first piston portion (102a) and the second piston portion (102b) further comprising:
a substantially axial first bore (151a, 151b) extending at least partially through the head, portion (103a, 103b); and
a substantially axial second bore (152a, 152b) connecting to the first bore (151a, 151b), with the second bore (152a, 152b) being larger in diameter than the first bore (151a, 151b) and separated from the first bore (151a, 151b) by a shoulder (153a, 153b).

22. The piston assembly (100) of claim 14, with the first piston portion (102a) and the second piston portion (102b) further comprising:
a substantially cylindrical sleeve portion (104a, 104b) joined to the head portion (103a, 103b) opposite the mating face (105a, 105b);
a substantially axial first bore (151a, 151b) extending at least partially through the head portion (103a, 103b); and
a substantially axial second bore (152a, 152b) extending at least partially through the sleeve portion (104a, 104b), with the second bore (152a, 152b) connecting to the first bore (151a, 151b) and with the second bore (152a, 152b) being larger in diameter than the first bore (151a, 151b) and separated from the first bore (151a, 151b) by a shoulder (153a, 153b).

23. The piston assembly (100) of claim 14, with the annular stiffness insert (120) further comprising:
- two outer annular stiffness components (120*a*, 120*c*); and
- a middle annular stiffness component (120*b*) sandwiched between the two outer annular stiffness components (120*a*, 120*c*).

24. The piston assembly (100) of claim 14, with the annular stiffness insert (120) further comprising:
- two outer annular stiffness components (120*a*, 120*c*) formed of a first material; and
- a middle annular stiffness component (120*b*) sandwiched between the two outer annular stiffness components (120*a*, 120*c*) and formed of a second material.

25. The piston assembly of claim 14, with the annular stiffness insert (120) further comprising:
- two outer annular stiffness components (120*a*, 120*c*);
- a middle annular stiffness component (120*b*) sandwiched between the two outer annular stiffness components (120*a*, 120*c*); and
- a circumferential magnet groove (122) formed in an outer circumferential surface of the middle annular component (120*b*).

* * * * *